(No Model.)  2 Sheets—Sheet 1.

W. C. BANKS.
ELECTRICAL INSTRUMENT.

No. 593,187. Patented Nov. 9, 1897.

Attest:
C. W. Benjamin
Peter A. Vermilye

Inventor:
William C. Banks
By A. D. Vermilye
his atty (No Model.)  2 Sheets—Sheet 2.

W. C. BANKS.
ELECTRICAL INSTRUMENT.

No. 593,187. Patented Nov. 9, 1897.

Attest:
C. W. Benjamin
Peter A. Vermilya

Inventor
William C. Banks
by A. S. N. Vermilya
his atty

UNITED STATES PATENT OFFICE.

WILLIAM C. BANKS, OF NEW YORK, N. Y.

ELECTRICAL INSTRUMENT.

SPECIFICATION forming part of Letters Patent No. 593,187, dated November 9, 1897.

Application filed March 12, 1897. Serial No. 627,076. (No model.)

*To all whom it may concern:*

Be it known that I, WILLIAM C. BANKS, a citizen of the United States of America, and a resident of the city of New York, N. Y., have invented certain new and useful Improvements in Electrical Instruments, of which the following is a specification, reference being had to the accompanying drawings, forming part of the same, in which—

Figure 1:
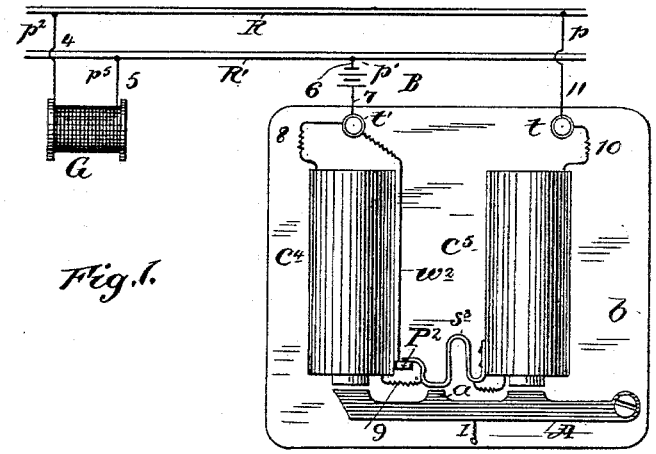
Figure 2:
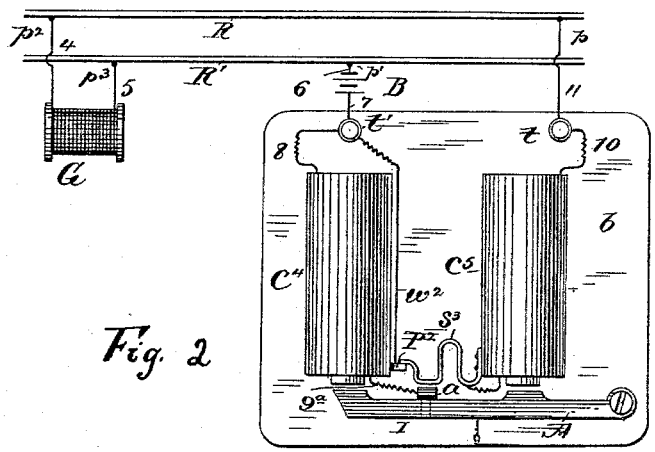
Figure 3:
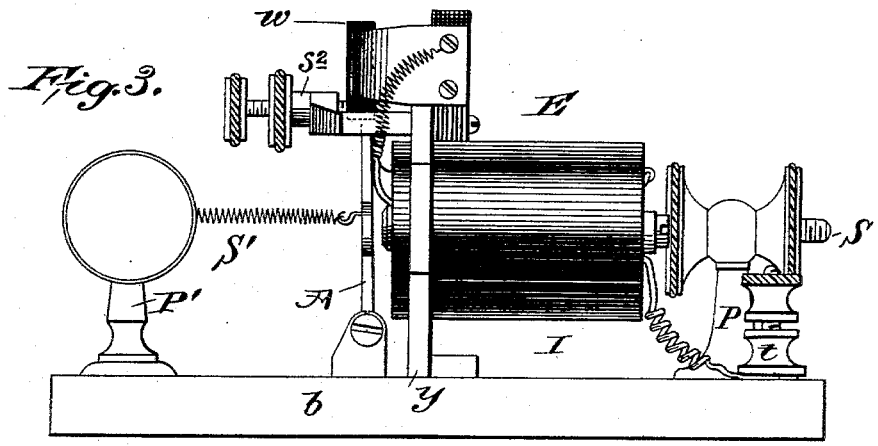
Figure 4:
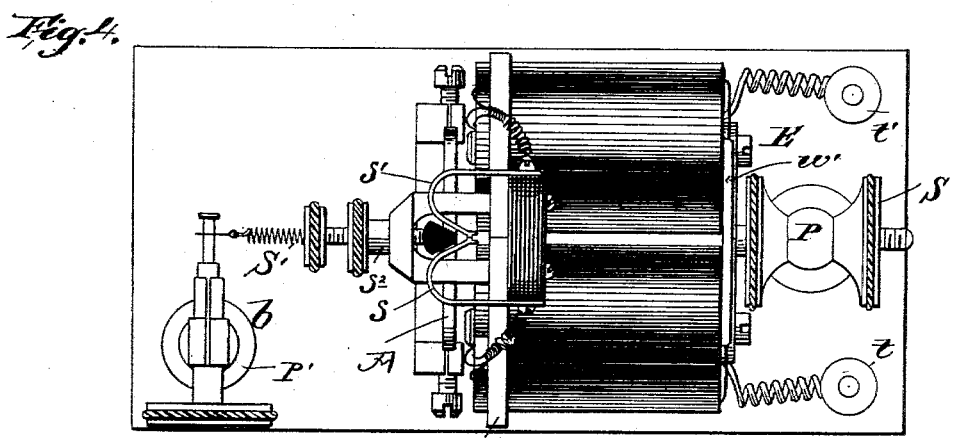
Figure 5:
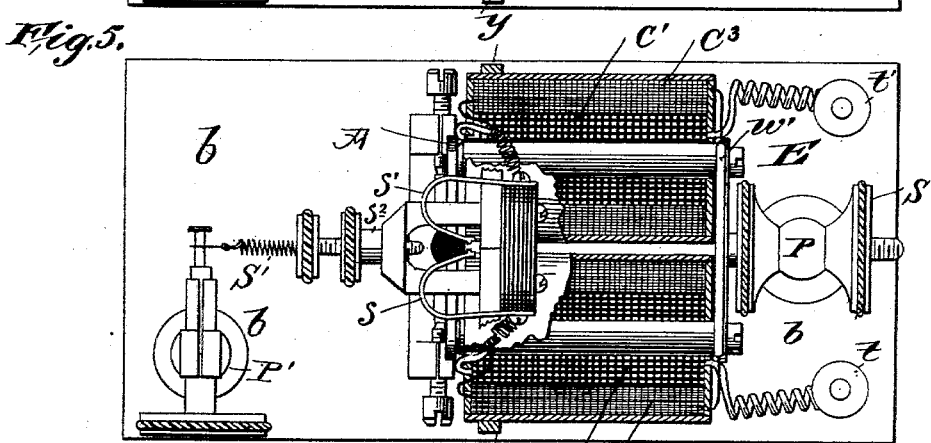

Figure 1 is a plan view of a block of a railroad-signal system in which my automatic resistance-inserter has been placed. Fig. 2 shows a similar block and instrument, except that the connection from coil $C^5$ to coil $C^4$ is modified. Fig. 3 is a side elevation of an instrument embodying one form of the new device I employ in my system. Fig. 4 is a plan view of said instrument. Fig. 5 is a plan and sectional view of the same.

In many arrangements of electrical devices, especially those used in railroad block-signal systems, two conductors are provided which are to have something move over and upon them from an adjacent situation, and a relay or other electrical instrument connected with one part of said conductors is in circuit through them with a battery or other source of electrical power connected with said conductors at other points than those where the relay is connected, with some space between, that when the moving body passes upon the conductors between the relay connections and the battery connections there may be a short circuit established between the poles of the battery within the line of the relay connections, which will cause the relay to operate in a given way. The disadvantage of this arrangement with ordinary systems of this character is that when the battery is thus short-circuited the relay resistance is, as it were, cut out and the power of the battery is wasted if the body running upon the two conductors and creating the short circuit should remain for any appreciable time between the location of the points where the relay connects with the conductors and those where the battery connects with the conductors.

For instance, if R and R' were the rails of a railroad with a battery B connected to them at $p$ and $p'$ and a signaling-relay connected to them at $p^2$ $p^3$, then, assuming for the moment my resistance-inserter to be merely a circuit connection, the circuit is from one pole of the battery to one rail, thence to one relay connection, thence through the relay and its other connection to the other rail of the road, and through it to the other pole of the battery.

Normally the resistance of the relay is included in the circuit and prevents the rapid deterioration of the battery at B, the resistance of many of such relays in use being from four to ten ohms. Now when a train runs upon such a block the battery, as is apparent, is short-circuited, the line being from one pole to one rail, thence by the car-wheels and axles of the train to the other rail and back to the other pole of the battery, and the resistance of the relay is not encountered in that circuit, wherefore the battery begins to waste, and if the train, as is often the case, should remain on the block for a considerable time the life of the battery would be correspondingly short. To provide for this, I have placed near the battery an additional resistance normally out of the battery-circuit, (or, rather, normally short-circuited,) but with a switch operated by an electromagnet in the battery and relay circuit and controlled by a spring or equivalent, the tension of which is such that when the relay resistance is operating against the current that will not produce sufficient power in the switch-magnet to close the switch; but when the short circuit about the relay is established then the current, relieved of the relay resistance, will give sufficient power to the switch-magnet to move its armature and cut into the battery-circuit, the new resistance, (or, rather, to break a short circuit of low resistance, leaving only a circuit through a relatively high resistance,) which, taking the place of the relay resistance, will effectually prevent the objectionable waste of battery-power noted.

The battery, relay, rails, &c., need no especial description. They are all well known, and I would add that in carrying out my invention I do not limit myself to the instrument I now intend to describe, as many possible variations of form and arrangement will readily present themselves to skilled electricians and mechanicians.

The form here shown in Figs. 3, 4, and 5 consists of a suitable base $b$, on which I mount an electromagnet E, (of very low resistance, often four-tenths ohms,) supported in a yoke Y at one end and by a post P with an adjusting-screw S at the other end. I prefer to use two coils C C', but one could be omitted. The battery connection is made at one binding-post or terminal $t$ and the rail connection at another, $t'$. The other ends of these coils are joined to spring-pieces $s$ $s'$, supported on an upright U, connected to the yoke. These spring-pieces at their supports are insulated one from the other, but their free ends are normally in contact, and the circuit is therefore normally through coils C and C'. The armature A swings on trunnions or pivots in a position in front of the poles of the magnet and is held retracted by a spring S', secured to an adjusting-post P'. This armature carries a non-conducting wedge, round, or arc circuit-breaker $w$, lying adjacent to and in front of the point where the springs $s$ $s'$ make contact with each other. Secondary coils $C^2$ $C^3$, (of higher resistance, often ten ohms,) wound on the same cores, respectively, with coils C and C', are connected to the respective wires of said coils at or near their points of issuance from the coils C C', and these coils $C^2$ $C^3$ are connected to each other at the opposite ends, as shown at $w'$. A stop $s^2$ limits the movement of armature A and wedge $w$.

The operation is manifest. When relay G is in the circuit, the current passing through C and C' is not sufficiently strong to attract armature A with such power as to cause the wedge $w$ to force spring-pieces $s$ $s'$ apart against the stress of said springs and the adjustment-spring S'; but when the train has short-circuited the battery B, the relay being outside of that short circuit, the current through the electromagnet is stronger. It attracts magnet A with sufficient force to draw it forward. Wedge $w$ enters between and breaks the contacts of $s$ and $s'$, and the circuit must not only be through coils C and C', but also through the additional coils $C^2$ $C^3$, which are of such a character as to furnish the additional resistance required to replace that of the relay cut out by the short-circuiting caused by the running on the block of train T. Indeed I frequently make the resistance of coils $C^2$ and $C^3$ greater than that of relay G.

It will thus be seen that, though there is always a complete circuit never wholly broken, I am enabled, the instant relay G is short-circuited, by the very result of that short-circuiting, to switch a supplemental resistance into the battery-circuit, as thus established, to take the place of that without that short circuit.

I prefer the instrument of Figs. 3, 4, and 5, as it is compact, and the winding of two coils on one core adds to the magnetic effect produced on armature A when the short circuit is established within the relay-lines; but, as illustrated in Figs. 1 and 2, I could vary the arrangement.

That the device may be more readily understood I trace the connections of Fig. 5, which are identical with those of Figs. 3 and 4. From terminal $t$, supposed to be connected with rail R of the block, a wire leads to coil C of the magnet. The other end of said coil is connected to contact-spring $s$, and also, as shown, to the left-hand end of coil $C^2$, and the left-hand end of coil C' is connected to contact-spring $s'$ and also to the left-hand end of coil $C^3$. The right-hand ends of coils $C^2$ and $C^3$ are connected together by wire $w'$, here shown as partially covered with insulating material, and the right-hand end of coil C' is connected to terminal $t'$, which is supposed to be connected to battery B, which in turn is connected to rail R'. When spring $s$ makes contact with spring $s'$, the circuit through the instrument is from terminal $t$ by wire to coil C, thence by spring $s$ to spring $s'$, and thence by coil C' to the wire leading to terminal $t'$, the short circuit about the resistance $C^2$, or both resistance-coils $C^2$ and $C^3$, being substantially the contact, coil C', and the wire from it to terminal $t'$. At this time coils $C^2$ and $C^3$ are also (in the instrument shown in Fig. 5) actually in the circuit, though not necessarily so; but the so-called "short circuit" about them presenting less resistance the main portion of the current manifests itself accordingly. When contacts $s$ and $s'$ are separated, the short circuit is broken, and the circuit is then only complete through the resistance-coils—that is, from terminal $t$ to coil C—from its left-hand end to the same end of coil $C^2$, across by wire $w'$, from the right-hand end of coil $C^2$ to coil $C^3$, and from the left-hand end of coil $C^3$ to terminal $t'$ by way of coil C'.

In Fig. 1 the circuit is as follows: Starting from battery B it is by wire 6 to rail R', wire 5, relay G, wire 4, rail R, wire 11, terminal $t$, wire 10, coil $C^5$, spring $s^3$, post $P^2$, short-circuit wire $w^2$, terminal $t'$, and wire 7 to battery B. At the same time the circuit through coil $C^4$ is similar as far as spring $s^3$, and thence by wire 9 to coil $C^4$, and from it to terminal $t'$, by wire 8, and by wire 7 to battery B.

The only difference in Fig. 2 is that the connection from spring $s^3$ to coil $C^4$ is by means of arm $a$ (which may be insulated from armature A) and wire $9^a$. As armature A moves inward by reason of the attraction of the electromagnet, arm $a$ makes contact with spring $s^3$, and the resistance-circuit is thus established before the short circuit is broken by forcing the end of spring $s^3$ away from post $P^2$.

What I claim as my invention, and desire to secure by Letters Patent, is—

1. The combination of a circuit, including a resistance, a generator, an electromagnetic circuit-breaker, the latter two of which are always in circuit a second resistance and a short circuit about it, all arranged substantially as set forth, whereby the removal of the first resistance will operate the circuit-breaker to open the short circuit about the second resistance and constitute its circuit a part of the only complete circuit through the generator.

2. The combination of a closed circuit including a resistance, a generator, an electromagnetic circuit-breaker, the latter two of which are always in circuit a second resistance and a short circuit about it, all arranged substantially as set forth, whereby the removal of the first resistance will operate the circuit-breaker to open the short circuit about the second resistance and constitute its circuit a part of the only complete circuit through the generator.

3. The combination of a circuit including a first resistance, a generator and an electromagnetic circuit-breaker the latter two of which are always in circuit the armature of the magnet of which circuit-breaker when the first resistance is in unobstructed circuit, is held by a force greater than the force of the electromagnet, but less than the force of said electromagnet when a short circuit is established around said first resistance, a second resistance, and a short circuit about it, all arranged as described, whereby when the force of said circuit-breaker magnet is augmented as described it will open the short circuit about the second resistance and constitute the circuit of said second resistance a part of the only complete circuit through the generator.

4. The combination of a circuit including a relay and a generator, of an electromagnet whose coil is continuously a part of the generator-circuit, a second resistance, a circuit including said second resistance and said electromagnet, circuit connections from said electromagnet to said generator not including said second resistance, two contact-points, at least one of which is in that circuit which excludes the second resistance, and one of which is sustained upon a yielding support, an armature to said electromagnet adapted as described to force back said point on that yielding support and break the circuit, which excludes the second resistance, when a short circuit is established about the relay, all substantially as set forth.

5. An electrical instrument, composed of an electromagnet provided with an armature, two terminals one connected to one end of the magnet-coil, a resistance one end in circuit with the second end of the magnet-coil, the other end connected to the second terminal, two contact-points adapted to break and make contact with each other, one connected to an end of the magnet-coil, other than that which is connected to the first terminal, a short circuit, not including the resistance electrically connecting the second terminal and the second contact-point, one of which contact-points is mounted upon a yielding support in the line of movement of the magnet-armature, whereby a sufficient excitation of said electromagnet will cause its armature to force and hold the contact-points apart and break and hold open the short circuit, thus making the only complete circuit from terminal to terminal include the resistance, and will yet leave the magnet-coil in the said circuit from terminal to terminal, substantially as set forth.

6. An electrical instrument, composed of an electromagnet provided with an armature, two terminals one connected to one end of the magnet-coil, a resistance, arranged substantially as described, with its core constituting a pole of an electromagnet whose armature is the same as that of the electromagnet proper, said resistance having one end in circuit with the second end of the magnet-coil, the other end connected to the second terminal, two contact-points adapted to break and make contact with each other, one connected to an end of the magnet-coil, other than that which is connected to the first terminal, a short circuit, not including the resistance electrically connecting the second terminal and the second contact-point, one of which contact-points is mounted upon a yielding support in the line of movement of the magnet-armature, whereby a sufficient excitation of said electromagnet will cause its armature to force and hold the contact-points apart and break and hold open the short circuit, thus making the only complete circuit from terminal to terminal include the resistance, and will yet leave the magnet-coil in the said circuit from terminal to terminal, substantially as set forth.

7. An electrical instrument, composed of an electromagnet provided with an armature, two terminals one connected to one end of the magnet-coil, a resistance one end in circuit with the second end of the magnet-coil, the other end connected to the second terminal, two contact-points adapted to break and make contact with each other, one connected to an end of the magnet-coil, other than that which is connected to the first terminal, a short circuit, not including the resistance electrically connecting the second terminal and the second contact-point, one of which contact-points is mounted upon a yielding support in line of movement of the magnet-armature, a spring whose stress is opposed to that attractive force of the electromagnet operating upon its armature whereby a sufficient excitation of said electromagnet will cause its armature to force and hold the contact-points apart and break and hold open the short circuit, thus making the only complete circuit from terminal to terminal include the resistance, and will yet leave the magnet-coil in the said circuit from terminal to terminal, but upon a diminution of said magnetic force said contact-points will be again brought together and the short circuit about the resistance automatically reëstablished, all substantially as set forth.

8. An electrical instrument composed of an electromagnet provided with an armature, two terminals, one connected to one end of the magnet-coil, a resistance-coil wound upon the same core with the coil of the electromagnet, one end in circuit with the second end of the magnet-coil and the other end in circuit with the second terminal, two contact-points adapted to break and make contact with each other one connected to one end of the magnet-coil other than that connected to the first terminal, a short circuit not including the resistance-coil, electrically connecting the second point and the second terminal, one of which points is mounted on a yielding support in the line of movement of the magnet-armature, all substantially as set forth.

9. An electrical instrument composed of a two-coil electromagnet, each double wound, two terminals one connected to one end of one coil, the other connected to an end of the other similar coil, connections between the respective ends of the first coils which are not directly connected to the terminals and the adjacent respective ends of the second coils, a connection between the respective opposite ends of said second coils, two contact-points, one or both carried on yielding supports and connected respectively to those ends of the first coils which are not directly connected to the terminals, and an armature to the so-constituted electromagnet supported and adapted to move in line with the yielding support of at least one contact-point, all substantially as set forth.

10. An electrical instrument composed of a two-coil electromagnet, each double wound, two terminals one connected to one end of one coil, the other connected to an end of the other similar coil, connections between the respective ends of the first coils which are not directly connected to the terminals and the adjacent respective ends of the second coils, two spring contact-pieces, connected respectively to those ends of the first coils which are not directly connected to the terminals, and having faces inclined toward their mutual point of contact, and an armature to the so-constituted electromagnet carrying a finger adapted as described to force said spring-contacts apart and means substantially as set forth, for normally holding said finger from separating said contact-pieces, all substantially as set forth.

In testimony that I claim the foregoing as my invention I have signed my name, in presence of two witnesses, this 11th day of March, 1897.

WM. C. BANKS.

Witnesses:
PETER B. VERMILYA,
A. G. N. VERMILYA.